United States Patent [19]

Jaros et al.

[11] 4,036,750

[45] * July 19, 1977

[54] USE OF ACTIVATED FLUID COKE TO REMOVE ORGANIC CONTAMINANTS FROM WASTE WATERS

[75] Inventors: Stanley E. Jaros, North Plainfield, N.J.; William J. Metrailer, Baton Rouge, La.

[73] Assignee: Exxon Research and Engineering Company, Linden, N.J.

[*] Notice: The portion of the term of this patent subsequent to Oct. 18, 1991, has been disclaimed.

[21] Appl. No.: 542,587

[22] Filed: Jan. 20, 1975

Related U.S. Application Data

[63] Continuation-in-part of Ser. No. 454,279, March 25, 1974, abandoned, which is a continuation of Ser. No. 267,232, June 28, 1972, abandoned.

[51] Int. Cl.$^2$ .................................................. B01D 15/02
[52] U.S. Cl. .......................................... 210/27; 210/33; 210/40
[58] Field of Search ................. 210/27, 33, 39, 40, 210/502; 252/421, 445; 423/445, 449, 450

[56] References Cited

U.S. PATENT DOCUMENTS

| | | | |
|---|---|---|---|
| 3,244,621 | 4/1966 | Bouthilet | 210/40 |
| 3,322,550 | 5/1967 | Murphy | 252/421 |
| 3,455,820 | 7/1969 | Joyce et al. | 210/40 |
| 3,840,476 | 10/1974 | Metrailer | 252/421 |

Primary Examiner—Thomas G. Wyse
Assistant Examiner—Ivars Cintins
Attorney, Agent, or Firm—John W. Ditsler

[57] ABSTRACT

This invention relates to a novel activated fluid coke composition, a method for forming same, and an improved process for removing organic material from waste water by contacting said waste water under adsorption conditions with said activated fluid coke. The activated fluid coke may be prepared by contacting fluid coke with a gaseous mixture containing steam at temperatures of at least about 1500° F. for a period of time sufficient to convert at least 35 weight % of the fluid coke to gaseous products. The activated fluid coke so formed preferably has a total surface area of at least 400 square meters per gram, and a pore volume of at least 0.20 cubic centimeters per gram. The large pore volume and large total surface area, along with the particle size, particle size distribution, particle shape, particle density and attrition resistance of the activated fluid coke, result in said activated fluid coke exhibiting excellent properties as an adsorbent, particularly for removing organic materials from waste water streams.

14 Claims, 2 Drawing Figures

USE OF ACTIVATED FLUID COKE TO REMOVE ORGANIC CONTAMINANTS FROM WASTE WATERS

CROSS REFERENCE TO RELATED CASES

This is a continuation-in-part of application Ser. No. 454,279 filed Mar. 25, 1974, now abandoned which in turn is a continuation of application Ser. No. 267,232, filed June 28, 1972, now abandoned.

BACKGROUND OF THE INVENTION

1. Field of the Invention

This invention relates to a novel method of using an activated fluid coke composition, to remove both soluble and insoluble organic materials from waste water. More particularly, one aspect of this invention relates to treating municipal and industrial waste waters or mixtures thereof, and in particular, to removing organic pollutants which comprise predominantly nonbiodegradable organic compounds from industrial waste water by contacting said waste water under adsorption conditions with activated fluid coke. The activated fluid coke employed to remove organic impurities from waste water is characterized in having: (1) a large pore volume, preferably above about 0.20 cubic centimeters per gram; (2) a relatively large total surface area preferably at least 400 square meters per gram due to the activation of at least a portion of both the interior and exterior of the fluid coke particle; (3) a uniformly spherical particle shape wherein the particle size ranges from about 50 to about 400 microns; and (4) essentially attrition-resistant properties. The activated fluid coke having the properties mentioned above may be prepared by treating fluid coke with a gaseous stream containing steam at elevated temperatures, preferably at least about 1500° F., for a period of time sufficient to convert a substantial portion of the coke, i.e., at least about 35 weight %, to gaseous products. When employed to remove organic contaminants from waste water streams, it is preferable that the waste water is first clarified by settling in order to remove a major portion of the solids suspended in the waste water. Thereafter, the waste water is treated with activated fluid coke in order to remove, by adsorption, an appreciable portion of the dissolved organic materials as well as the suspended solids remaining therein.

DESCRIPTION OF THE PRIOR ART

The most common method presently employed for removing impurities from waste water comprises a primary settling step wherein a major portion of the solids suspended in the waste water is removed with or without the aid of chemical flocculating agents. A secondary treating step may then be performed to decompose by bacteriological action the remaining suspended solids which are usually present in a concentration ranging from about 50 to about 150 ppm. The secondary treating step generally employs vigorous aeration to allow the bacteria to continue their metabolic activity. The effluent from the secondary biological treating step is settled to remove the bacteria as a sludge. Thereafter, the clarified effluent is passed into rivers or streams generally with no further purification, while at least a portion of the sludge is recycled to the secondary treating zone.

This method of biologically treating waste water was developed primarily for the treatment of sanitary or household sewage, which is typically found in a municipal sewer, and has generally yielded satisfactory results provided a high degree of purification is not desired. Recently, however, industrial plants have been discharging waste waters into municipal sewer systems. This has resulted in serious difficulties since such waste waters contain a significant amount of nonbiodegradable pollutants and toxic materials. These nonbiodegradable pollutants are not removed from the industrial waste waters and the toxic materials contained therein destroy the bacteria in the secondary biological treatment step, thereby rendering the treatment plant inoperable for a period of time while the toxic materials are purged from the system and new bacterial growth reestablished.

In determining the degree of contamination of a waste water stream, certain recognized measures have been developed. They include: Biochemical Oxygen Demand (BOD), which is the quantity of oxygen in milligrams per liter or parts per million utilized in the biochemical oxidation of the organic matter contained in the water within a period of 5 days at 20° C. and often designated as $BOD_5$; and Chemical Oxygen Demand (COD), which is the quantity of oxygen expressed in milligrams per liter or parts per million consumed under specific oxidation conditions with strong chemical oxidizing agents, such as sodium chromate (see *Method for the Examination of Water and Waste Water*, 12th Edition, Public Health Association, New York, New York, (1965), pp. 510-514, which is herein incorporated by reference). Generally, the acceptable minimal standard expressed in terms of $BOD_5$ and COD for a purified waste water stream is about 20 and about 100 milligrams per liter, respectively.

Recent standards being promulgated for pollution abatement are generally stated in terms emphasizing COD rather than BOD. Municipal sewage generally has a $BOD_5$ prior to entry into the primary settler discussed above ranging from about 100 to about 150 milligrams per liter. Municipalities which have significant amounts of industrial waste water discharged into their sewage system may have $BOD_5$ within the range of 200 to 400 milligrams per liter or higher. After the municipal sewage has been treated in the primary settling step, the $BOD_5$ will be in the range of from about 50 to about 100 milligrams per liter or higher if a substantial amount of industrial waste water is contained in the municipal sewage. The COD will generally be considerably higher than the $BOD_5$ depending on the amount of nonbiodegradable material in the sewage. For example, if the municipal sewage contains primarily sanitary sewage, the COD will be only slightly higher than the $BOD_5$. However, with a substantial quantity of effluents from industrial plants contained in the sewage, the COD may be two to three times as high as the $BOD_5$, both before and after the sewage has been passed through the primary settling step. After the secondary biological treatment, the $BOD_5$ as well as the COD for the purely sanitary sewage, will be normally in the range of from about 20 to about 35 milligrams per liter. However, in the event that substantial amounts of industrial waste are included in the municipal sewage, the effluent from the secondary biological treatment can exhibit a COD of 100 milligrams per liter or higher.

Accordingly, it can be seen that the removal of nonbiodegradable impurities from industrial waste waters requires treatment additional to that necessary for normal sanitary sewage. This is due primarily to the industrial waste waters containing a much higher concentration of nonbiodegradable impurities than is present in normal sanitary sewage. For example, the COD of such industrial waste waters can range from about 100 to 2000 milligrams per liter, and in some cases as high as 5000 to 6000 milligrams per liter. Since large amounts of nonbiodegradable organic compounds are present in the industrial waste waters after the biological secondary treatment, the effluent from said treatment may still have a COD as high as 600 to 1000 milligrams per liter. Furthermore, industrial waste waters usually have a high concentration of toxic materials such that biological treatment, even under the best of conditions, is generally unreliable and subject to frequent destruction of the biological organisms. Hence, the effluents passed into receiving waters from such treatment can approach the COD of raw waste waters. Although these organic contaminants may be nonbiodegradable and thus not considered to deplete the oxygen content of the receiving waters, they may biodegrade over a period greater than the 5 days measured by the BOD test and thus deplete oxygen in larger rivers and lakes. Furthermore, the nonbiodegradable contaminants may be obnoxious since such contaminants affect the taste, odor and color of the receiving waters and exhibit toxic effects on the fish and plant life therein. Thus, even when the biological treatment plants are operating under optimum conditions, the amount of organic contaminants removed may not be sufficient to meet the standard presently being established. As a consequence, there is a need for further treating of the effluents from such biological secondary treatment plants, as well as a need for an improved process for treating industrial waste waters, in order to remove both biodegradable and non-biodegradable organic contaminants therefrom so as to prevent the undesirable results mentioned above.

In order to remove the organic contaminants from waste waters, particularly industrial waste waters, it has been proposed to treat the waste waters as well as the effluent from the secondary biological treating step with activated carbon. For example, U.S. Pat. Nos. 3,244,621 and 3,455,820 disclose methods for removing organic soluble impurities from waste water by passing said waste water through a bed of activated carbon. It has also been suggested to remove phenolic compounds from waste water by contacting the waste water with a hot bed of coke contained in the coking drum of a delayed coking unit.

Generally, methods of employing activated carbon to remove contaminants from waste water have met with only limited commercial success due to either the limited adsorption capability or the high cost of the adsorbents. For example, when delayed coke is employed as the adsorbent, only suspended oils and phenolic compounds are removed from the waste water stream. The use of activated carbon has been severely inhibited by associated processing difficulties and the inherent high initial cost of the material. In addition, the high attrition and regeneration losses which occur when activated carbon is employed in the prior art processes mentioned above result in high make-up costs. Activated carbons in powdered form, although available at relatively low initial cost since they are produced largely by the partial incineration of waste liquors from paper manufacture, are difficult to remove from the treated water because of their highly subdivided state which results in very low settling rates. Thus when using powdered activated carbon, each contact stage requires a subsequent settling stage having a long residence time and the use of expensive organic polymers as flocculants. Furthermore, after removal from the water, no practical techniques have been developed for regenerating activated powdered carbon for use. Thus, even if the initial unit cost of the powdered activated carbon is relatively low, the overall operating cost becomes exorbitant since the material can be used only once and then must be disposed of at an additional cost.

Granular activated carbons, such as those produced from coal, are expensive adsorbents because they require a multistep process for their manufacture in order to produce them with uniform particle size and acceptable hardness. Even though these materials have greater hardness and attrition resistance than the so-called "soft" activated carbons produced from other materials such as wood, nut shells and the like, the attrition resistance of granular activated carbon still leaves much to be desired. Specifically, a significant portion of the granular activated carbon is lost due to attrition in the handling and use of the material. This may occur, for example, when the granular activated carbon is removed from the waste water contacting bed(s) and regenerated in a device such as a multiple-hearth furnace, the regenerated granular activated carbon then being recycled to the contacting bed(s). Not only does this represent a high operating cost due to the make-up with fresh granular activated carbon material, but the fines produced by said attrition are difficult to remove from the treated water and, therefore, represent a source of contamination. Furthermore, because of the fragility of the granular activated carbon, the waste water treating processes that have been devised employing such carbon have been severely limited since such processes must necessarily inhibit the motion of the carbon granules in the process in order to minimize attrition.

With regard to forming the activated fluid coke used herein, the prior art is replete with broad disclosures relating to "activating" fluid coke by treatment with steam and/or air at elevated temperatures. In U.S. Pat. No. 3,007,849, there is described a process for the desulfurization of fluid coke particles which initially involves treating fluid coke with steam at a temperature in the range of 1400° to 1600° F. for a period of from 2 to 10 hours, preferably 3 to 8 hours, such that the treated fluid coke has surface areas of 330 square meters per gram or less and, thereafter, contacting the steam treated particles with hydrogen in order to desulfurize the coke. Further, U.S. Pat. No. 3,322,550, which relates to preparing a mixture of petroleum coke particles and an agglutonating carbonaceous binder, there is likewise broadly disclosed a method for etching the exterior surface of petroleum coke with air or steam at elevated temperatures, preferably in the range of from about 1020° to about 1480° F. In addition, while the patent literature has broadly disclosed that petroleum coke may be treated with steam and/or air in an attempt to activate such material (see, for example, U.S. Pat. No. 2,721,168 and 3,565,827), none of the prior art suggest that fluid coke, when activated at the present conditions, would form a material having a total surface area of at least 400 square meters per gram, a pore volume of at least 0.20 cubic centimeters per gram, and a high attrition resistance.

Accordingly, in view of the inadequacies of the adsorbents employed to date, and in particular the high initial cost and attrition losses inherent in employing granular activated carbons, the art is in need of an inexpensive adsorbent material which can effectively remove contaminants from municipal sewage and industrial waste water steams without the attendant difficulties mentioned above.

SUMMARY OF THE INVENTION

It has now been unexpectedly discovered that when fluid coke is contacted with a gaseous stream containing steam at a temperature of at least 1500° F for a period of time sufficient to convert at least 35 weight % of the fluid coke to gaseous products, there is formed an activated fluid coke composition which exhibits superior adsorbent properties than heretofore obtainable with fluid coke material, particularly in the removal of organic impurities from waste water streams. In addition, the unique physical properties of the activated fluid coke so produced allow particularly efficient contacting techniques to be employed in purifying waste water streams. The activated fluid coke employed in the practice of the instant invention is characterized in having a uniform particle size in the range of from about 50 to about 300 microns; large total surface area, preferably above about 400 square meters per gram, due to activation of at least a portion of the exterior and interior, predominantly the interior, of the particle; and unexpectedly large pore volume, preferably above about 0.20 cubic centimeters per gram. In addition, the activated fluid coke of the instant invention exhibits a low ash content, normally in the range of from about 0.05 to about 0.15 weight %. Further, this activated fluid coke exhibits unusual hardness and cohesive strength so as to undergo essentially no, i.e., less than 1%, attrition when employed as an adsorbent in accordance with the instant invention.

DETAILED DESCRIPION OF THE INVENTION

Figure 1:
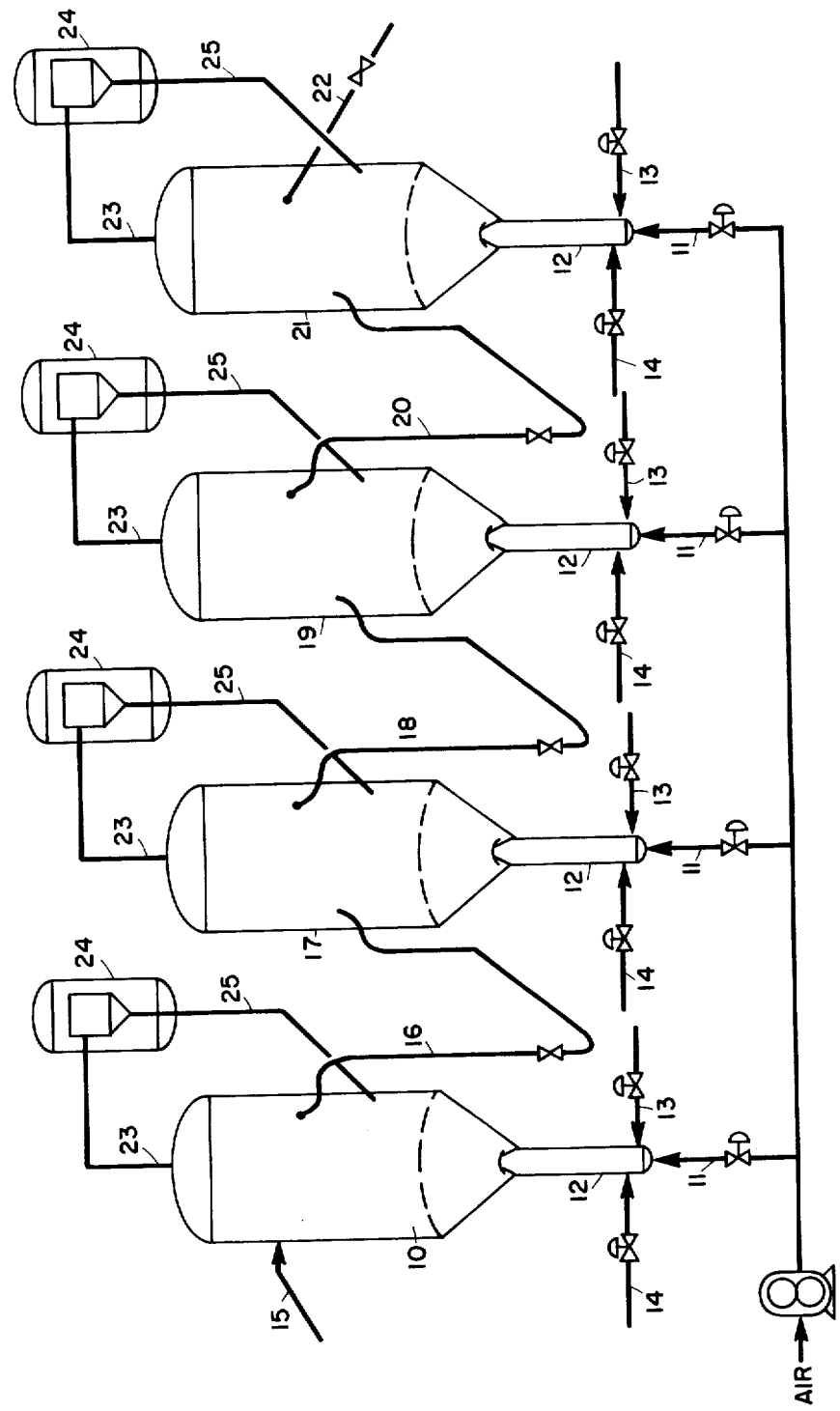
FIG. 1 is a schematic drawing showing the process flow of a preferred method of forming the activated fluid coke.

The present invention relates to an activated fluid coke composition, a method of activating the fluid coke and to a process for using same to remove organic impurities from waste water streams, said activated fluid coke being characterized by having (1) a large total surface area, preferably at least 400 square meters per gram, (2) a large pore volume, preferably at least 0.20 cubic centimeters per gram, (3) a uniform spherical shape and (4) a high attrition resistance.

The fluid coke to be activated as described hereinafter is the solid material produced from the thermal cracking of a heavy hydrocarbon oil feedstock to lighter hydrocarbon fractions. Basically the fluid coking process comprises a reaction zone and a combustion zone, i.e., the coking vessel and the burner vessel, respectively. In a typical operation, the heavy hydrocarbon oil to be processed is injected into the coking vessel which contains a dense, turbulent fluidized bed of hot inert solid particles, preferably coke particles. Uniform mixing of the bed results in virtually isothermal conditions therein and effects instantaneous distribution of the feedstock. In the coking vessel, the feedstock is partially vaporized and partially cracked. Product vapors are removed from the coking vessel and are sent to a fractionator for recovery of gas and light distillates therefrom, with any heavy bottoms usually being returned to the coking vessel. The coke produced in the process remains in the bed coated on the solid particles. The coke particles with their fresh layer of coke are then passed to a burner vessel. Steam is injected into a stripping section at the bottom of the coking vessel to remove strippable hydrocarbon oil from the coke particles prior to their passage to the burner vessel.

The heat for maintaining the endothermic coking reaction is generated in the burner vessel. The stream of coke particles is transferred from the coking vessel to the burner vessel via a standpipe and riser system, air and/or steam being supplied to the riser for conveying the solids to the burner. Sufficient coke or carbonaceous material is burned within the burner vessel to raise the temperature of the solids therein to a level sufficient to maintain the entire system in heat balance. This is accomplished by recycling the hot coke from the burner vessel to the coking vessel. The solids in the burner vessel are maintained at a higher temperature than the solids in the coking vessel. About 5 to about 15% of the coke produced in the coking vessel is burned for this purpose. The unburned portion of the coke represents the net coke formed in the process which is withdrawn therefrom.

Heavy hydrocarbon oil feeds suitable for the fluid coking process are crude oils, heavy or reduced crudes, vacuum bottoms, pitch, asphalt, or other heavy hydrocarbon petroleum residua or mixtures thereof derived from petroleum, coal, shale oil kerogen or tar sands bitumen. Typically, such feeds can have an initial boiling point of about 600° F. or higher, an API gravity of about 0° to 20° and a Conradson carbon residue content of about 5 to 40 weight %. (As to the Conradson carbon residues, see ASTM-D-180-52).

The fluid coking process should be operated with solids having a particle size ranging between about 50 and 1,000 microns, preferably between about 50 and about 600 microns in diameter with an average particle size ranging between about 50 and about 400 microns. Preferably not more than 5 wt. % have a particle size below about 75 microns since small particles tend to agglomerate or are removed from the system with the gases. Each particle has a laminar structure comprising from about 10 to about 100 superimposed layers of petroleum coke produced by cyclical exposure of the particle through the burner and reactor vessels. Product distribution is such that a predominant portion, that is, about 90 wt. % has a diameter less than 400 microns with a range of from about 50 to about 850 microns. The superficial exterior surface area of the fluid coke, i.e. the area of the actual outside surface of the coke particles, is in the range of from 0.01 to about 0.05 square meters per gram, assuming the particles to be perfect spheres. The corresponding exterior unactivated surface area of the fluid coke as measured by the Brunauer-Emmet-Teller equation for physical adsorption of nitrogen, i.e. BET test, ranges from about 0 to about 15 square meters per gram. Further, in view of the dense spherical laminar structure of the fluid coke, the fluid coke particles possess essentially no pore volume.

In general, the activated fluid coke of the present invention is prepared by contacting the fluid coke described above at elevated temperatures with an oxidizing gas such as air, steam, $CO_2$ or mixtures thereof, for a sufficient period of time such that the fluid coke exhibits adsorptive capacity due to the activation of the interior and exterior of the particle. Ordinary fluid coke substantially lacks such capacity. More specifically, the fluid coke is contacted with a gaseous mixture comprising steam at a temperature of at least about 1500° F. for a period of time sufficient to convert at least 35 weight % of the fluid coke to gaseous products, thereby forming an activated coke composition which exhibits the characteristic properties mentioned above, said activated fluid coke being uniquely suited for removing impurities from waste water streams. Preferably, the fluid coke is contacted in a fluid bed with a gaseous stream containing from about 30 to about 90 mole % steam; and still more preferably, it is advantageous that the gaseous stream contain more than 50 mole % steam in order to form the superior adsorbent material of the instant invention. In addition, it is preferred to minimize the amount of free oxygen present in the fluid bed since it is believed that the presence of oxygen tends to reduce the surface area of the activated coke, particularly at more severe temperature, i.e. 1600° F. or above.

If there is substantially no free oxygen in the system, the activation must be at a temperature of at least about 1500° F., preferably at a temperature of at least 1550° F. and still more preferably at a temperature of at least about 1600° F. It has been found essential that the activation be carried out at such temperatures for a period of time sufficient to convert at least 35 weight %, preferably at least 40 weight %, and still more preferably for a period of time sufficient to convert from about 45 to about 70 weight % of the fluid coke material to gaseous products in order to form an activated carbonaceous material exhibiting a total surface area of at least 400 square meters per gram and a pore volume of at least 0.20 cubic centimeters per gram. As will be appreciated, when an activation temperature of about 1500° F. is employed, it will be necessary to activate the material for a longer length of time to form an activated fluid coke material having essentially the same total surface area and pore volume than when a higher activation temperature such as about 1600° F. is employed. It is preferred, however, that the activation be carried out for a period of at least 10 hours, preferably at least 12 hours, still more preferably in the range of from about 13 to about 16 hours. Most preferably, the fluid coke is activated by contact with a gaseous stream containing at least 50 mole % steam, such as a stream containing from 50 to 60 mole % steam, 35 to 45 mole % nitrogen, and 1 to 10 mole % carbon dioxide, said stream formed by contacting a fuel gas such as methane with air and steam, at a temperature in the range of from about 1575° to about 1600° F, for at least 10 hours in order to form the present activated fluid coke composition.

The method of forming activated fluid coke will be more clearly understood by reference to FIG. 1 which shows a schematic flow diagram for a preferred processing sequence for forming the activated fluid coke compositions of the present invention. Referring to FIG. 1, a high temperature gaseous stream containing steam is generated in the bottom portion of reactor 10 by introducing air by way of line 11 into the conical shaped portion 12 of reactor 10. A fuel gas such as natural gas is introduced by way of line 13 into the conical shaped portion 12 of reactor 10. This air-fuel mixture is further contacted in the conical shaped portion 12 of reactor 10 with steam passed by way of line 14. As excess amount of the fuel gas may be employed to insure the absence of free oxygen in the resultant activating gaseous stream particularly when temperatures of 1600° F. or greater are employed. The flame temperature is modulated by introducing a controlled amount of steam with the flue gas in order that the temperature is maintained in the range of about 2600° F. beneath the fluid bed. Refractory arch gas distributors are used to distribute the hot gases into the fluid bed systems.

The fluid coke produced in the manner described above is introduced into the reactor 10 by way of line 15 and is contacted with the gaseous stream containing steam at a temperature of about 1200° F. for a period of about 2 hours in order to preheat the fluid coke material. Thereafter, the preheated fluid coke material is withdrawn from reactor 10 by way of line 16 and is introduced into reactor 17, which reaction zone is maintained at a temperature of about 1600° F. Heat for the reaction is provided for reaction zone 17 in the same manner as was provided for reaction zone 10. The partially activated coke particles are removed from reaction zone 17 after about 3.5 hours by way of transfer line 18 and are introduced into reaction zone 19 which is maintained at a temperature of 1600° F. in the same manner as reaction zone 17. After contact with the gaseous stream containing steam for about 4.5 hours, the further partially activated coke is withdrawn from reaction zone 19 and passed by way of transfer line 20 into the final reaction zone 21, wherein it is contacted with a gaseous stream containing steam in the same manner as in reaction zones 17 and 19 for a period of about 5.5 hours. The final, fully activated fluid coke product is withdrawn from reaction zone 21 by way of line 22. The overhead from reaction zones 10, 17, 19 and 21 pass by way of line 23 into cyclones 24 where the fines are recovered and returned by way of line 25 to the reaction zones. The pressure in reaction zone 10, 17, 19 and 21 is maintained at the range of from about 15 to about 60 psia, preferably at about 30 psia. The continuous, multiple-vessel activation scheme described above is preferred to batch, single-vessel operations because operating conditions can be established and maintained at a substantially constant level. For example, the increasing and decreasing of temperature inherent in batch, single vessel operations is avoided, thus requiring less attention to the unit and providing a relatively stable temperature distribution during said activation.

The activated fluid coke having the above-mentioned characteristics is particularly advantageous as an adsorbent for the purification of waste water streams. One advantage is that the activated fluid coke formed by the method used herein results in relatively smooth, uniformly spherical particles having a size in the range of from about 50 to about 600 microns, preferably from about 50 to about 400 mircrons, and more preferably from about 50 to about 300 microns. This is to be contrasted with the very rough surface and random shape of conventional granular activated carbon which normally has a particle size in the range of from about 400 to about 2400 microns. On the average, the particle size of the activated fluid coke employed in the waste water treatment process of the instant invention is about 175 microns as compared with an average particle size of granular activated carbon which ranges from about 1000 to about 1500 microns. Accordingly, the smaller diameter of the activated fluid coke particles increases the rate of adsorption of the organic materials from waste water since shorter distances are traversed through the pores of the particles.

Another advantage is that the activated fluid coke has a large total surface area and pore volume relative to other low cost adsorbent materials such as coal, delayed coke and the like, which allows for the efficient adsorption or organic materials from waste water. The total surface area is in the range of from about 400 square meters per gram to about 650 square meters per gram. Preferably, the total surface area of the activated fluid coke is above 450 square meters per gram, and still more preferably above 500 square meters per gram. The term "total surface area" as used herein refers to both the interior and exterior surface area of the activated fluid coke. Furthermore, the pore volume of the activated fluid coke is in the range of from about 0.20 to about 0.40 cubic centimetes per gram. It is preferred that the pore volume of the activated fluid coke be above 0.25 cubic centimeters per gram, still more preferably above 0.30 cubic centimeters per gram.

The large total surface area is believed due to both the nature of the starting material and the activation procedure employed herein. As described above, fluid coke is formed by depositing a fresh layer of coke on an internally generated coke particle in the fluid coker vessel. The coke particle with its fresh layer of coke is then passed to a burner vessel wherein the coke is partially gasified and the fresh layer baked onto the particle. Accordingly, by successive passages from one vessel to another, a dense spherical particle of layered coke is formed which exhibits unusually high strength and density. When activated, each of the approximately 10 to 100 superimposed layers of coke comprising the fluid coke particle has a thickness of about 1 to 8 microns. The layers because of their thinness, will bend flexibly before breaking. The inter-laminar spaces are approximately 0.1 micron in thickness. However, there occurs in each particle approximately 8 to 10 inter-laminar spaces which have a thickness of from about 2 to about 5 microns. In addition, in each layer there are approximately 30 to 50 fissures of approximately 2 to 5 microns in width and 15 to 40 microns in length. The spaces between each of the layers and the fissures in each layer provide ready access to a large interior surface area, said surface area resulting from the formation of a plurality of micropores extending from the surface of each layer to the interior of said layer as will be described hereinbelow. This larger interior surface comprises a major portion, i.e. at least 70%, preferably at least 80%, more preferably at least 90%, and most preferably at least 5%, of the total surface area of the activated fluid coke particle. Thus, the fissures in each layer and spaces between the layers allow for ingress of fluids into the interior of the coke particles such that the interior surface is available for adsorption of organic materials from said fluids. Hence, the activated fluid coke is an excellent adsorbent material.

The procedure employed to form the activated fluid coke particle described above involves the controlled selective and non-selective oxidation of a fluid coke particle. More specifically, the spaces between the layers and the fissures within each layer of activated fluid coke are formed by the controlled non-selective oxidation of at least a portion of the coke with the oxidizing gas. By controlled is meant maintaining the activation conditions of temperature, oxidizing gas composition, and residence time within the specified limits of the present procedure such that both the desired amount and type of fissures within each layer and spaces between each layer are obtained. For example, if the activation conditions are too severe, the fissures will be extreme and the individual layers will fracture. However, if the conditions are too mold, the fissures will be small and ready access to the interior of the coke particle will not be provided. The suitable may be established by microscopic examination of the particles.

The micropores mentioned above which are responsible for the large interior surface are are believed to be formed during activation by the controlled selective oxidation of certain anisotropic graphitic crystallites. While not wishing to be bound by any particular theory, it is believed that such crystallites are formed as each layer of coke is deposited on an internally generated coke particle, and immediately thereafter devolatilized and cyclized. By cyclized is meant that aliphatic branches are converted to highly condensed aromatics. During devolatilization, gases are evolved rapidly from the freshly forming layer of coke so as to orient, in the radial direction, the highly condensed aromatic molecules as they are formed, thus forming crystallites in the radial direction of the particle. The crystallites so formed have anisotropic properties and as such are considerably more reactive to oxidizing gases in their axial direction, i.e., the radial direction of the fluid coke particle, than in their other dimensions. When activated at the conditions described above, the antisotropic crystallites are selectively gasified in the axial direction, such that micropores are formed which extend from the surface of each layer in the particle to the interior of the layer. As evidence for the existence of such crystallites, when the cross-section of a fluid coke particle is viewed under an electron-scanning microscope, the layers of fluid coke appear to have a fibrous structure oriented in the radial direction. This is generally recognized as evidence of crystalline orientation which is substantially different from the amorphous structure of delayed coke. Furthermore, X-ray examination gives evidence of said crystalline structure. Thus the term "activation" as used herein refers to (1) opening spaces between the layers of fluid coke, (2) opening fissures within each layer, and (3) forming micropores extending from the surface of each layer to the interior of the layer.

Still another advantage is that the shape and hardness, i.e. attrition resistance, of the activated fluid coke material allows particularly efficient contacting techniques to be employed. Since the activated fluid coke particles are essentially smooth and uniformly spherical, as well as possessing a high density and attrition resistance, said fluid coke particles settle rapidly in water relative to activated carbon. Thus, in a waste water treatment process wherein the water is passed upwardly through a normally confined stationary bed of activated carbon, the rapid settling of the activated fluid coke particles in water permits the passage of waste water at a relatively high velocity upwardly through a bed of activated fluid coke without entrainment of any of the fluid coke particles from the bed despite the small size of the coke particles. This advantageous feature of the activated fluid coke allows the contacting vessels to be of a minimum size for a given volume of water to be treated. In addition, because of the activated fluid coke particles, substantially no fines are produced from using this material even when it is vigorously agitated with water over long periods of time.

Another advantage exhibited by the activated fluid coke of the present invention relative to activated granular carbon is the low level of chemical reactivity. This chemical unreactivity greatly facilitates the regeneration of the activated fluid coke and is believed due to the low ash content of said activated fluid coke, said ash content ranging from about 0.05 to about 0.15 wt. %. This is to be contrasted with the ash content of granular activated carbon which is normally in the range of from about 15 to about 20 wt. %. The low ash content is believed to be due to the petroleum source of the coke as compared with the source of the activated granulated carbon material, i.e. coal. Accordingly, the organic materials adsorbed on the surface of the micropores of the activated fluid coke are much more chemically reactive to an oxidizing gas such that said materials can be readily oxidized from the exterior and interior surface of the activated fluid coke without deterioration of said surfaces. This greatly reduces the losses of activated fluid coke during regeneration and allows for the almost complete restoration of its original adsorptive capacity. In contrast, activated granular carbon formed from coal is almost as reactive as the organic contaminants adsorbed on its surface. Therefore under regeneration conditions which might be employed to thoroughly remove the organic material adsorbed on the surface of the micropores of the activated fluid coke particles and restore the coke particles to their original adsorption capacity, a substantial portion of the activated carbon is unavoidably gasified, i.e., burned away. In the case of the activated fluid coke, the difference in reactivity, probably due to both its low ash content and the vitreous nature of the coke layers, is sufficient to allow the use of powerful oxidizing gases such as air for regeneration instead of mild oxidizing agents such as steam. Accordingly, oxidizing agents such as air may be employed at much lower temperatures, i.e., in the range of from about 650° to about 800° F., rather than steam at temperatures above 1500° F., preferably in the range of from about 1600° to about 1800° F., to regenerate the adsorbent material. Of course, the use of steam at such elevated temperatures may likewise be employed to regenerate the activated fluid coke of the instant invention.

A further advantage of employing activated fluid coke as an adsorbent for purifying waste water steams is the relatively inexpensive and simplified method by which fluid coke can be both activated and regenerated, particularly when compared with the methods required for doing same to granular carbon. The fluidized-solids bed activation process discussed above favors the inherent size distribution, shape and attrition resistance of the fluid coke particles in providing a stable and efficient means for contacting said particles with a suitable heating and oxidizing gas stream. Because of the intimate and efficient contact between the fluid coke particles and activating gas stream, the temperature and gas compositions within the fluid bed are substantially uniform. This feature enables precise control of temperature and local gas compositions within the fluid bed such that the activation or regeneration can proceed rapidly without an excessive amount of non-selective oxidation. This results in a more complete utilization of the oxidizing gases such that the amount of gas that must be employed may be reduced as well as the costs necessarily associated with supplying it. In addition, the fluid bed activating reactor can be operated at higher pressures, up to 10 or 20 atmospheres, which results in higher activation rates and more efficient utilization of the activating gas. In contrast, the use of rotary kilns and multiple-hearth furnaces for activating granules produced from coal, i.e., activated granular carbon, result in less efficient contacting between the activating gas and the granules, thus requiring the use of much larger quantities of said gas. A fluid bed activation process cannot be effectively employed with coal granules because their larger size and size distribution does not permit a stable fluidized-solids bed. In addition, the fragile nature of the coal granules results in excessive attrition losses doe to the impact of the particles against each other in the fluid bed. Similarly and for the same reasons, a vessel containing a fluidized-solids bed can be employed for regenerating the activated fluid coke.

Thus in view of the advantages noted above, the activated fluid coke is well suited to remove a major portion i.e., above 50% and preferably in the range of from about 80 to about 95% of the organic contaminants from a waste water stream. In general, the sanitary, industrial or municipal waste water stream is first clarified by settling prior to contact with the activated fluid coke material. Coagulating polymers or lime treatment may be employed in this settling step to increase the overall removal of the suspended solids. In the event that the raw waste water contains appreciable amounts of oil, other means of clarification, such as an API separator or a dissolved air floatation unit may be employed. The purpose of this primary treatment is to remove essentially all of the suspended solids and oils.

While the main purpose of contacting the waste waters with the activated fluid coke material is to remove the dissolved organic materials by adsorption, it is often difficult to remove all the suspended solids or oil in the primary separation step. Thus the subsequent contacting with activated fluid coke removes the remaining suspended solids and oils efficiently and thoroughly. Even when the bed of activated coke is in an expanded state such as when the waste water is passed upwardly through the bed, the small particle size of the activated fluid coke results in a small interstitial dimension within the bed providing an efficient filter for the remaining suspended solids present in the waste water. Further, the bed is normally incapable of being plugged since the particles can move slightly relative to one another in order to accommodate the presence of solid suspended matter trapped among the particles of activated fluid coke. This feature favors a low pressure drop relative to operations wherein the water is passed downflow. Accordingly, it is evident that the inherent shape and size distribution of the activated fluid coke particles result in a very stable fluidized-solids bed.

After the primary treatment, the waste water is contacted with the activated fluid coke. It has been found that although suspended oils may be attracted to unactivated coke, organic materials which are in the truly dissolved state are not removed to any significant degree. The activated fluid coke may be contacted with the waste water in a number of different ways. For example, a concentrated slurry of the activated coke suspended in water can be metered and mixed into a previously contacted waste water stream in a pipe which then enters a vessel where the activated fluid coke readily separates from the treated waste water. The partially spent activated fluid coke from the bottom of this vessel can then be withdrawn as a slurry and contacted in a similar fashion with raw waste water, and by such a succession of steps a countercurrent contacting or raw waste water with activated fluid coke is achieved. In view of the high settling rates of the activated fluid coke particles due to their high density and smooth spherical shape, the preferred method of obtaining countercurrent contacting may be achieved by introducing a slurry of fresh activated fluid coke suspended in clean water into the top of a cylindrical vessel while raw waste water is continuously introduced into the bottom of this vessel. The activated fluid coke particles then exist in the vessel in the form of an expanded fluidized-solids bed. Spent activated fluid coke can then be continuously withdrawn from the bottom of the bed as a concentrated slurry for circulation through a regenerator after removing the bulk of the remaining water in a simple device, such as a screen, while the purified water is continuously removed from the top of the vessel. In such a scheme, it is seen that the raw waste water is first exposed to the exhausted activated fluid coke which only removes suspended solids and oils by physical filtration. These solids and oils are removed from the bottom of the vessel along with the spent activated fluid coke. As the water proceeds up through the expanded bed of activated fluid coke, it comes in contact with progressively less exhausted activated fluid coke, until near the top of the bed it is in contact with the freshest activated fluid coke, thereby resulting in the highest degree of removal of dissolved organic materials from the treated water leaving the top of the vessel.

The temperature within the bed during the contacting of the activated fluid coke with the waste waters is not critical and is normally in the range of from about 50° F. to about 100° F. Likewise, the pressure is not a critical variable and is normally maintained at or near atmospheric pressure. The velocity of the water being treated is in the range of from about 3 to 7 gpm/sq. ft. such that the bed is expanded in the range between 30 and 75%. The residence time of the waste water in the contacting vessel varies from about 30 to about 60 minutes in order to reduce the levels of $BOD_5$ and COD of the raw waste water from about 500 and 1500 mg./liter, respectively, to a $BOD_5$ level ranging from about 20 to 50 and a COD level ranging from about 60 to 100 mg/liter, respectively. Even higher levels of purity of the treated water can be obtained by providing a larger bed of activated fluid coke and a longer residence time.

The spent activated fluid coke is regenerated to remove adsorbed organic material from the surface of the micropores of the activated fluid coke. Typically, the activated fluid coke is regenerated at a temperature of from about 600° to 850° F. by admitting preheated air at the bottom of the regeneration vessel for an extended period of time, i.e. in the range of from about 30 to 90 minutes. The air also serves as a fluidizing gas. The organic material adsorbed in the micropores of the activated fluid coke particles, along with the suspended solids and oils which adhere to the outer surface of the particles due to the filtration action discussed above, are volatilized and burned away from the particles. A secondary combustion zone may be provided at the top of the regeneration vessel, or in a separate vessel after the regenerator vessel, wherein excess air is admitted to effect complete combustion of the organic materials to $CO_2$ and water. The flue gases may then be scrubbed with raw waste water to remove traces of sulfur and nitrogen oxides which may be present. The regenerated coke particles are continuously withdrawn from the bed and allowed to fall into a tank of water to cool and to produce a slurry which is returned to the top of the water treating vessel.

Alternatively, steam or a mixture of steam and flue gas may be used to regenerate the spent activated fluid coke. In this case, the temperature is maintained in the range of from about 1400° to about 1650° F. for a period of time ranging from about 15 minutes to about 20 hours. The temperature and residence time for regeneration of activated fluid coke is not as critical as in the case of granular activated carbon produced from coal because of the inherently greater chemical inertness of the activated fluid coke, as has been mentioned above. Therefore, more severe conditions may be used to effect the thorough removal of adsorbed material without jeopardizing the integrity of the activated fluid coke particles.

Figure 2:
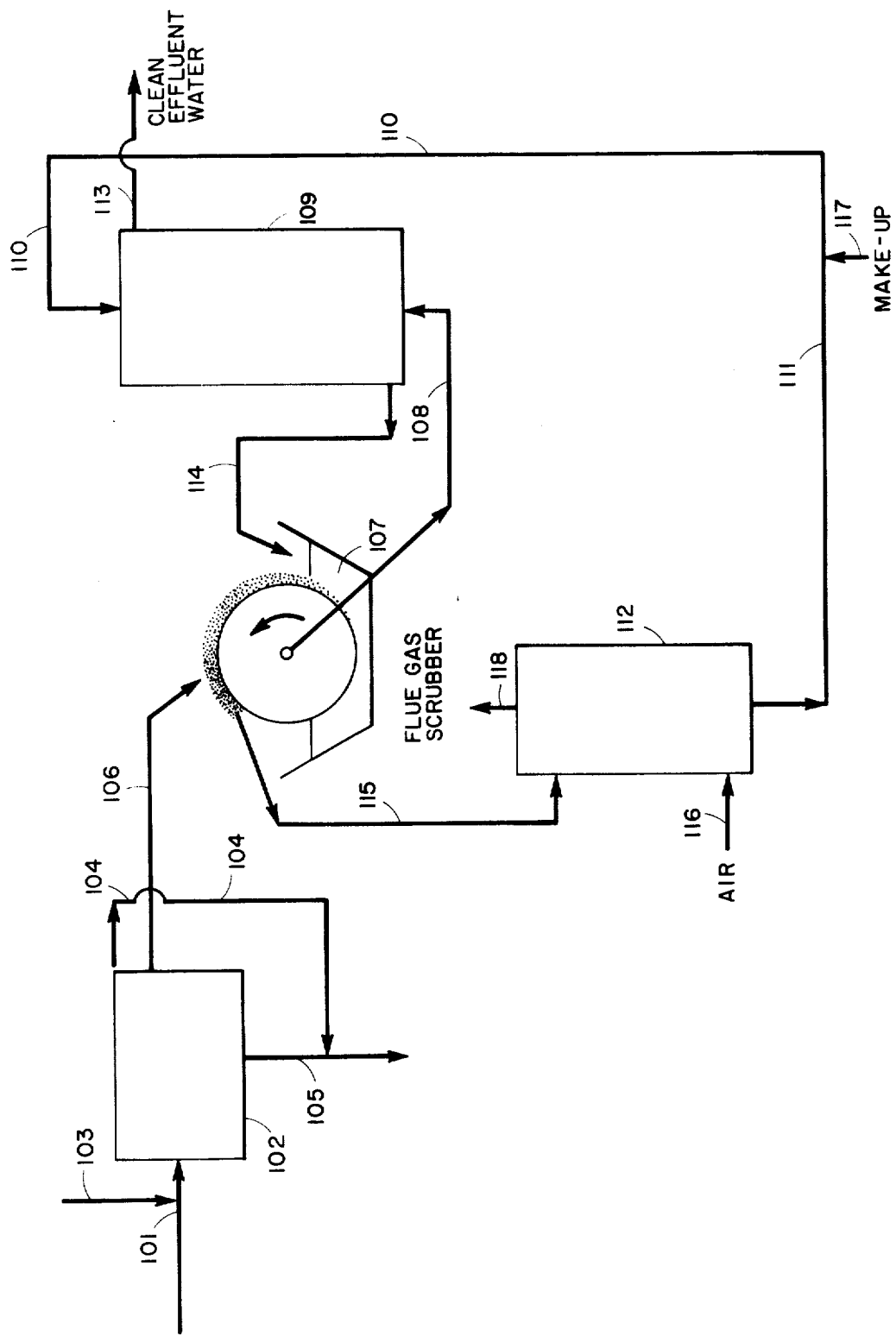
FIG. 2 is a schematic drawing showing a preferred embodiment of the waste water treatment process of the present invention.

A preferred embodiment of the waste water treatment process of the preferred invention is shown in FIG. 2. In FIG. 2, waste water having $BOD_5$ and COD levels ranging from about 50 to 1000 and from about 50 to 5000 milligrams per liter, respectively, which waste water may contain sanitary, or household, industrial or municipal wastes, is introduced which are normally present in such waste waters include the following: suspensed oil, suspended paper fibers, organic solid materials, dissolved phenolic compounds, organic acids, alcohols, esters, or other mixtures such as may occur in the waste waters of petroleum refineries, petro-chemical plants, paper mills, food processing plants, or miscellaneous manufacturing plants. A coagulating agent which may include alum, lime, activated clay as is disclosed in U.S. Pat. No. 3,487,928, polyacrylonitrile, sulfonated polystyrene, and the like is passed through line 103 into the raw waste pater in line 101. Typically, 1 to 5 ppm and preferably 1 to 3 ppm, of the coagulating agent is added to the raw waste water by the way of line 103. The waste water passed into the primary separator 102 is subjected to a gross removal of impurities present in the waste water. In the primary separator the waste water is allowed to stand for 30 to 90 minutes in order to permit the suspended solids to settle. Floatable oil and other insoluble material are removed from the top of the primay separator by conventional means, such as a rotating skimming device, and withdrawn through line 104. Sludge, which is composed of solid particles in the waste water such as salt, fibers, tar and the like, settles to the bottom of the primary separator 102 and is removed through line 105. Generally, ambient conditions are utilized in the primary separator. The effluent from the primary separator is then removed through line 106. Typically, the effluent contains small amounts of residual suspended oil and organic solids, as well as dissolved organic compounds, such that the BOD of the pretreated waste water being passed by way of line 106 is normally in the range of from about 50 to 900 milligrams per liter and the COD between about 150 and about 4500 milligrams per liter.

The primary separator effluent 106 may then be passed directly to contacting zone 109 wherein it is contacted with the activated flluid coke adsorbent. It is preferred, however, to first pass the effluent 106 through a vacuum filter 107. The filter serves to remove a substantial portion of the solids which remain in the primary effluent steam. The filter may be a rotating or a batch sand-filter type. In a preferred embodiment, spent fluid coke from the contacting zone 109 is passed by way of line 114 to the vacuum filter 107 which acts as the initial filter for the primary effluent.

The effluent from the filter 107 which has a $BOD_5$ of from about 50 to 800 milligrams per liter and a COD of from about 50 to 3500 milligrams per liter is passed by way of line 108 into contactor 109 which contains a bed of the activated fluid coke described above. The primary effluent waste water stream is preferably passed upwardly through contactor 109 at a rate of 2 to 10 gpm/sq. ft., preferably 4 to 8 gpm/sq. ft., and countercurrently contacted with the activated fluid coke which is introduced into the top portion of the contactor 09 by the way of line 110. The rate at which the activated fluid coke is introduced into the contactor depends on the amount of impurities to be removed from the waste water and on the rate of the water feed. For example, if it it desired to remove 500 milligrams per liter of COD, and the waste water is being passed upwardly through the bed of activated fluid coke at a rate of 4 gallons per minute per square foot, the activated fluid coke would be introduced at the rate of about 3 pounds per hour per square foot in order to obtain COD removal of 0.35 pounds of COD per pound of activated coke. The temperatures within the contacting zone is about 30° to 160° F., preferably about 50° to 130° F. The pressure will vary between 0 and 30 psig.

The activated fluid coke removes substantially all of the remaining impurities by adsorption into the internal and external micropores which result from the activation procedure described above. Accordingly, substantially clean effluent water is recovered through line 113, the treated waste water having a BOD$_5$ of from about 10 to 50 milligrams per liter and a COD of from about 15 to 90 milligrams per liter. However, if the waste water contains high concentrations of poorly adsorbable compounds such as lower alcohols, the BOD$_5$ and COD levels of the effluent recovered by way of line 113 would be higher, possibly necessitating additional treatment. Since these compounds are readily biodegradable, they can be easily removed in a subsequent Biox, i.e. biological oxidation, unit.

The activated fluid coke is substantially spent, that is has exhausted a major amount of its adsorptive ability, must be regenerated for further use. Accordingly, the spent activated fluid coke is removed through line 114 as a slurry and passed into the filter zone 107. Within the filter zone, the fluid coke serves to provide a positive and efficient filtration of the primary separator effluent with a constantly renewed supply of clean filter medium that is free of occluded suspended material, which maintains a clean layer of coke on the filter drum which at the same time dewatering the fluid coke being passed to the regenerator 112 by way of line 115.

The spent activated fluid coke may be passed directly from contactor 109 to regenerator 112 by means not shown in the drawing, or, as mentioned above, be utilized in the removal of impurities within the filter zone 107. In either case, the fluid coke is passed into regenerator 112. The regenerator may be of several different types such as a multi-hearth furnace or a rotary kiln. Preferably, regenerator 112 is a fluid bed regenerator having a gas inlet designated as line 116. It is preferred to use air as the fluidizing and oxidizing medium; however, other gases such as steam and carbon dioxide may be utilized. The air is introduced into the regenerator at a rate such that the superficial velocity in the vessel is from about 2 to 5 feet per second. The air is heated and serves to maintain the temperature necessary for regenerating the spent fluid coke by combustion of the organic compounds absorbed thereon. Preferably, the temperature within the regenerator is maintained in the range of from about 600° to about 900° F. in order to reactivate and restore the adsorption capacity of the fluid coke. The pressure in the regenerator may vary between 0 and 50 psig. The passage of the air through the bed of particles serves to oxidize and burn away the solids and oils which adhere to the fluid coke as well as the organic materials which are absorbed in the micropores. A secondary combustion zone which is not shown may be included in to top of a regeneration vessel or in a separate vessel outside of the regenerator vessel, wherein excess air is admitted to effect complete combustion of the organic materials to $CO_2$ and water to avoid polluting the atmosphere. The temperature within such a zone may vary between about 1500° and about 1600° F.

Flue gas discharged from the top of regenerator 112 is recovered by way of line 118. The flue gas normally contains unreacted oxygen, $CO_2$ and $N_2$, and traces of sulfur oxides. The flue gas may be scrubbed with raw waste water to remove traces of sulfur and nitrogen oxides.

The regenerated coke particles are removed through line 111 and comingled with any make-up activated fluid coke which is to be added through line 117. The combined stream of make-up and regenerated activated fluid coke is passed into the top of contactor 109 via line 110 in order to achieve a continuos process.

This invention will be further understood by reference to the following examples which are not intended to unduly restrict the limits of the claims appendded hereto.

EXAMPLE 1

Fluid coke having an exterior unactivated surface area of less than 15 square meters per gram and essentially no pore volume was prepared by introducing a hydrocarbong feedstock comprising a vacuum residuum having the following characteristics: gravity, 1.07 gm./cc.; Conradson carbon, 31.6 weight %; sulfur, 4.0 weight %; into a fluid coking zone, as described above, the coking zone being maintained at a temperature in the range of from about 980° to about 990° F. in order to form a fluid coke material having the following characteristics; carbon, 86.75 weight %; hydrogen, 2.79 weight %; sulfur, 5.1 weight %; ash, 0.12 weight %; and having a surface area of 12 m.$^2$/gm. One hundred grams of this fluid coke, having a particle diameter ranging from 100 to 600 microns was contacted with a gaseous stream containing 80 mole % steam and 20 mole % nitrogen in Runs A through F under the conditions specified in Table I. In Runs G through I, the fluid coke was contacted with a gaseous stream containing 55 mole % steam, 40 mole % nitrogen and 5 mole % carbon dioxide, which runs simulte the preferred activation scheme of the instant invention as described in the preferred embodiment above, wherein air is contacted with a fuel gas and steam in order to provide the heat of reaction and fluidization to the fluid bed. In Run J the fluid coke is contacted with a gaseous stream containing 50 mole % steam and 50 mole % air.

The gaseous streams identified in Runs A through J in Table I were contacted with the fluid coke at a superficial gas velocity of 0.6 ft./sec. in a fluidized solids bed contained in an electrically-heated Vicor tube, 1 inch in diameter and 18 inches high, at the reaction temperatures and at a pressure of about 15 psia for the specific amount of time identified in Table I for each run. The total surface area and pore volume shown in Table I was determined by the BET nitrogen adsorption test. The pore diameter was calculated assuming that the pores are cylindrical. The pore size distribution was estimated by equilibrium water vapor adsorption from lithium chloride solution of different molarity.

Samples of the activated fluid coke material produced in accordance with Runs A through J were tested for their performance as adsorbents for removing contaminants from waste water streams as follows: A refinery waste water stream having a COD of 750 milligrams per liter was first passed through a millipore filter to remove the coarser suspended solids and oils. The filtrate had a COD of about 420 milligrams per liter in Run A, 600 milligrams per liter in Runs B-F, and 405 milligrams per liter in Runs G-J as determined by *Standard Methods for the Examination of Water and Waste Water*, 13th Edition, 1971, p. 495. 500 ml. aliquots of the filtrate were introduced into two 500 ml. glass-stoppered Erhlenmeyer flasks. 12 grams of the activated fluid coke were introduced into one of the flasks and 1.2 gms. into a second (equivalent to 200 lbs./1,000 gals. and 20 lbs./1,000 gals, respectively). Both flasks were then stoppered and stored in a refrigerator for 4 days, each flask being shaken twice a day. Equilibrium was believed reached after 4 days because results were substantially identical to those obtained after 3 days. The COD was determined on the supernatant liquid from each flask and the adsorptive ability and capacity of the activated coke determined from the COD reduction. The adsorptive ability of the activated fluid coke was measured by isotherms using a technique described in *Advance Waste Water Treatment*, Culp and Culp, Van Nostrand-Reinhold, pp. 252–255, which isotherms indicate the amount of COD contaminants remaining in the waste water after treatment with the activated fluid coke. The results are shown in Table I.

TABLE I

| Run | Activation Conditions | | | | TOTAL Area M²/gm. | Pore Vol. cc/gm. | Pore Diam. A | Pore Size Dist., cc/gm. | | | Density gm/cc. | | Column A Adsorption Isotherms Dose 200#/MG | | Column B Dose 200#/MG* | |
|---|---|---|---|---|---|---|---|---|---|---|---|---|---|---|---|---|
| | Gas | Temp. °F. | Hrs. | Conv. | | | | <100A | <300A | <1200A | Bulk | Pellet | COD PPM | Cap Mg/gm. | COD PPM | Cap Mg/gm. |
| A | S/N | 1500 | 7 | 34 | 448 | .25 | 22 | .119 | .138 | .139 | .97 | — | 300 | 50 | 150 | 5.6 |
| B | S/N | 1600 | 4 | 47 | 442 | .25 | 23 | .158 | .205 | .220 | .87 | — | 363 | 99 | 168 | 18.0 |
| C | S/N | 1500 | 11 | 35 | 413 | .20 | 19 | .137 | .155 | .155 | .95 | — | 426 | 73 | 205 | 16.5 |
| D | S/N | 1500 | 7 | 43 | 473 | .25 | 21 | .172 | .200 | .202 | .91 | — | 376 | 94 | 196 | 16.9 |
| E | S/N | 1500 | 15 | 62 | 642 | .39 | 24 | .206 | .285 | .301 | — | 1.17 | 326 | 115 | 167 | 18.1 |
| F | S/N | 1400 | — | 34 | 425 | .19 | 18 | .137 | .152 | .149 | — | — | 458 | 60 | 227 | 15.6 |
| G | A/F/S | 1500 | 7 | 41 | 363 | .29 | 32 | .132 | .144 | .152 | — | 1.27 | 270 | 58 | 105 | 12.8 |
| H | A/F/S | 1600 | 13 | 56 | 543 | .35 | 26 | .159 | .254 | .286 | .78 | — | 180 | 93 | 56 | 14.9 |
| I | A/F/S | 1600 | 8 | 39 | 349 | .25 | 30 | .132 | .162 | .171 | .92 | — | 220 | 79 | 78 | 14.0 |
| J | A/S | 1600 | 5 | 50 | 192 | .13 | 27 | .088 | .099 | .130 | .86 | 1.39 | 240 | 71 | 49 | 15.2 |

S/N = 80 mole % steam, 20 mole % N₂
A/F/S = 55 mole % steam, 40 mole % N₂, 5 mole % CO₂
A/S = 50 mole % steam, 50 mole % Air
Cap = capacity of activated coke to remove COD when the activated carbon is in equilibrium with waste water stream.
* = 400 #/MG for Run A As can be seen from the results shown in Table I, when fluid coke is activated with a gaseous stream containing steam at a temperature of at least 1500° F. for a period of time sufficient to convert at least 35 weight % of the fluid coke to gaseous products (Run G), there is obtained an activated fluid coke composition which exhibits a large total surface area and pore volume. Further, as can be seen from the results as tabulated in Column A and Column B of Table I, which columns indicate the amount of COD contaminants remaining in waste water streams after treatment with 20 pounds of the activated fluid coke per 1,000 gallons of waste water (column A) and 200 pounds of activated coke per 1,000 gallons of waste water for Runs B through J (400 No./MG of waste water for Run A) (Column B), respectively, the unusually high total surface area and pore volume allows the activated fluid coke to exhibit excellent properties as an adsorbent in removing impurities from waste water streams.

In addition, it should be noted that when a gaseous stream containing 80 mole % steam and 20 mole % nitrogen is employed and the activation temperature is increased to a range of about 1600° F. (Run B), a large total surface area activated fluid coke product exhibiting a pore volume of about 0.25 cubic centimeters per gram is obtained in a much shorter length of time, i.e., 4 versus 7 hours as shown in Run D. Further, it should be noted that when a gaseous stream containing 55 mole % steam, 40 mole % nitrogen and 5 mole % carbon dioxide is employed to activate the fluid coke at a temperature of 1600° F. (Run H), there occurs a further unexpected increase in the surface area, i.e., 543 square meters per gram, as well as an unexpected increase in the pore volume, i.e., 0.35 cubic centimeter per gram of the activated fluid coke. In this regard, it should be noted that when the fluid coke is activated at 1600° F. with a gaseous stream containing steam, nitrogen and $CO_2$ for a period of time greater than 8 hours, there occurs a sudden unexpected increase in both the total surface area and pore volume as is seen when Run H is compared with Run I.

EXAMPLE 2

This example compares the adsorption characteristics of an activated fluid coke composition prepared in accordance with the instant invention with a high quality, commercially available activated carbon. Samples of the activated fluid coke composition having the characteristics and prepared in accordane with Runs B, E and H of Example 1 and a commercially available granular activated carbon were tested by determining isotherms to establish their relative ability to reduce the COD of a refinery waste water stream. The COD and isotherms were determined by the techniques mentioned in Example 1. The results are shown in Table II.

Accordingly, it can be seen that the activated fluid coke of the instant invention is substantially equivalent to commerical activated carbon in both its ability and capacity to remove organic contaminants from waste water streams.

TABLE II

| Carbon Source | Activated Fluid Coke | | | Commercial Granular Activated Carbon | | |
|---|---|---|---|---|---|---|
| Run | B | E | H | B | E | H |
| Carbon Properties | | | | | | |
| Total Surface Area, m²/gm | 442 | 642 | 543 | | 1078 | |
| Pore Volume, cc/gm | 0.25 | 0.39 | 0.35 | | 0.73 | |
| Evaluation for Waste Water Treatment | | | | | | |
| Activated Carbon Dose of 20 lb/1,000 gal. | | | | | | |
| Equilibrium COD | 363 | 326 | 180 | | 356 | 160 |
| Equilibrium Capacity mg. COD/gm. carbon | 99 | 115 | 93 | | 102 | 103 |
| Activated Carbon Dose of 200 lb/1,000 gal. | | | | | | |
| Equilibrium COD | 168 | 167 | 56 | | 149 | 42 |
| Equilibrium Capacity mg. COD/gm. carbon | 18.0 | 18.1 | 14.9 | | 18.8 | 15.4 |

What is claimed is:

1. A countercurrent process for removing organic contaminants from waste water which comprises the steps of:
   1. introducing activated fluid coke suspended in water into the top of a vessel;
   2. introducing said waste water into the bottom of the vessel and passing the same upwardly therethrough in contact with said activated fluid coke;
   3. removing in a water slurry from the bottom of said vessel activated fluid coke containing organic contaminants; and
   4. recovering waste water depleted in organic contaminants from the top of the vessel;

said activated fluid coke being characterized by having a total surface area of at least 400 square meters per gram, a pore volume of at least 0.2 cubic centimeters per gram, an ash content of about 0.15 weight percent and an average particle size ranging from about 50 to about 600 microns.

2. The process of claim 1 wherein the interior surface area of the activated fluid coke is at least 70% of the total surface area.

3. The process of claim 1 wherein the residence time of the waste water in the bed is in the range of 30 to 60 minutes.

4. The process of claim 1 wherein the activated fluid coke withdrawn from the bottom of the said vessel in a water slurry is separated from the bulk of the slurry water, regenerated, and returned to the top of the vessel.

5. The process of claim 1 wherein the activated fluid coke containing organic contaminants is recovered and regenerating said contaminated fluid coke by contacting said fluid coke with air at temperatures in the range of from about 650° to about 800° F., the loss of activated fluid coke by attrition during regeneration being less than about 1 weight percent.

6. A countercurrent process for removing organic contaminants from waste water which comprises the steps of:

1. passing said waste water through a primary separation zone wherein a major portion of the suspended solid is removed from said waste water;
2. introducing continuously activated fluid coke suspended in water into the top of a vessel, said activated fluid coke having a total surface area of at least 400 square meters per gram, a pore volume of at least 0.2 cubic centimeters per gram, an ash content of about 0.15 weight percent and an average particle size ranging from about 50 to about 300 microns;
3. introducing continuously said waste water into the bottom of said vessel and passing the same upwardly therethrough in contact with said activated fluid coke at a velocity in the range from about 2 to about 10 gallons per minute per square foot of vessel cross-sectional area;
4. recovering waste water depleted in organic contaminants from the top of the vessel;
5. removing in a water slurry from the bottom of said vessel said activated fluid coke containing organic contaminants;
6. separating the bulk of the remaining slurry water from the activated fluid coke;
7. regenerating said activated fluid coke; and
8. returning said activated fluid coke to the top of said vessel.

7. The process of claim 6 wherein the activated fluid coke has a total surface area of at least 500 square meters per gram.

8. The process of claim 6 wherein the waste water is passed through said bed of activated fluid coke for a time sufficient for from about 80 to about 95 percent of the organic contaminants to be removed from said waste water.

9. The process of claim 6 wherein activated fluid coke containing organic contaminants is recovered and regenerating said contaminated fluid coke by contacting said contaminated fluid coke with air at temperature in the range of from about 650° to about 800° F., the loss of activated fluid coke by attrition during regeneration being less than about one weight percent.

10. The process of claim 6 wherein the interior surface area is at least 80% of the total surface area.

11. A process for removing suspended solids and organic contaminants from waste water which comprises the steps of:
    1. pre-treating said waste water in a primary separation zone wherein a major portion of the suspended solids are removed from said waste water;
    2. contacting said pre-treated waste water with an activated fluid coke having a total surface area of at least 400 square meter per gram, a pore volume of at least 0.25 cubic centimeters per gram, an ash content in the range of from about 0.05 to about 0.15 weight percent and an average particle size ranging from about 50 to about 600 microns in diameter; and
    3. recovering waste water depleted in organic contaminants.

12. The process of claim 11 wherein the interior surface area is at least 80% of the total surface area 13. The process of claim 11 wherein activated fluid coke containing organic contaminants is recovered and regenerating said contamined fluid coke by contacting said contaminated fluid coke with air at temperatures in the range of from about 650° to about 800° F.

14. The process of claim 13 wherein the loss of activated fluid coke by attrition during regeneration is less than about 1 weight percent.

* * * * *